United States Patent
Pianigiani et al.

(10) Patent No.: US 10,897,420 B1
(45) Date of Patent: Jan. 19, 2021

(54) SERVICE CHAINING AMONG DEVICES OF INTERCONNECTED TOPOLOGY

(71) Applicant: Juniper Networks, Inc., Sunnyvale, CA (US)

(72) Inventors: Jacopo Pianigiani, Cupertino, CA (US); Vivekananda Shenoy, Sunnyvale, CA (US); Ankur Tandon, Sunnyvale, CA (US); Atul S Moghe, San Jose, CA (US); Suresh K Balineni, Milpitas, CA (US); Tong Jiang, Fremont, CA (US); Kiran N. Kasim, Bangalore (IN); Sridevi JeevaRaj, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/235,993

(22) Filed: Dec. 28, 2018

(51) Int. Cl.
| H04L 12/741 | (2013.01) |
| H04L 12/46 | (2006.01) |
| H04L 12/713 | (2013.01) |

(52) U.S. Cl.
CPC .......... *H04L 45/54* (2013.01); *H04L 12/4641* (2013.01); *H04L 45/586* (2013.01); *H04L 45/745* (2013.01)

(58) Field of Classification Search
CPC ..... H04L 45/54; H04L 45/586; H04L 45/745; H04L 12/4641; H04L 2012/562; H04L 49/351; H04L 49/354; H04L 49/70; H04L 49/602
See application file for complete search history.

(56) References Cited

U.S. PATENT DOCUMENTS

| 9,571,394 B1 | 2/2017 | Sivaramakrishnan et al. |
| 9,998,324 B2 * | 6/2018 | Chanda ............... H04L 41/0803 |
| 10,355,989 B1 * | 7/2019 | Panchal .................. H04L 45/64 |
| 2014/0269733 A1 * | 9/2014 | Venkatesh ........... H04L 12/4641 370/395.53 |

(Continued)

FOREIGN PATENT DOCUMENTS

WO      2013184846 A1      12/2013

OTHER PUBLICATIONS

"contrail-specs/5.1/cfm-le-pnf-support.md," available at: github. com/Juniper/contrail-specs/blob/master/5.1/cfm-l3-pnf-support. md, Nov. 12, 2018, 8 pp.

(Continued)

*Primary Examiner* — Ario Etienne
*Assistant Examiner* — Kamal M Hossain
(74) *Attorney, Agent, or Firm* — Shumaker & Sieffert, P.A.

(57) ABSTRACT

An example data center system includes server devices hosting data of a first tenant and a second tenant of the data center, network devices of an interconnected topology coupling the server devices including respective service virtual routing and forwarding (VRF) tables, and one or more service devices that communicatively couple the network devices, wherein the service devices include respective service VRF tables for the first set of server devices and the second set of server devices, and wherein the service devices apply services to network traffic flowing between the first set of server devices and the second set of server devices using the first service VRF table and the second service VRF table.

20 Claims, 6 Drawing Sheets

(56) References Cited

U.S. PATENT DOCUMENTS

| | | | | |
|---|---|---|---|---|
| 2014/0307744 | A1* | 10/2014 | Dunbar | H04L 45/44 |
| | | | | 370/401 |
| 2015/0063102 | A1* | 3/2015 | Mestery | H04L 41/50 |
| | | | | 370/230 |
| 2016/0330125 | A1* | 11/2016 | Mekkattuparamban | |
| | | | | H04L 12/4633 |
| 2017/0324660 | A1* | 11/2017 | Sinha | H04L 45/586 |
| 2018/0159957 | A1* | 6/2018 | Hooda | H04L 45/64 |
| 2018/0309632 | A1* | 10/2018 | Kompella | H04L 41/0866 |
| 2018/0331951 | A1* | 11/2018 | Boutros | H04L 45/74 |
| 2018/0359323 | A1* | 12/2018 | Madden | H04L 67/104 |
| 2018/0375765 | A1* | 12/2018 | Osborne | H04L 45/74 |
| 2019/0141010 | A1* | 5/2019 | Chander | H04L 12/4641 |

OTHER PUBLICATIONS

Fernando et al., "Service Chaining using Virtual Networks with BGP," draft-fm-bess-service-chaining-00, Internet Draft, Jul. 5, 2015, 32 pp.

"OpenFlow Switch Specification," Version 1.1.0 Implemented (Wire Protocol 0x02), Open Networking Foundation, Feb. 28, 2011, 58 pages.

Jiang et al., "Translating High-Level Configuration Instructions to Low-Level Device Configuration," U.S. Appl. No. 15/198,657, filed Jun. 30, 2016.

\* cited by examiner

SERVICE CHAINING AMONG DEVICES OF INTERCONNECTED TOPOLOGY

TECHNICAL FIELD

This disclosure relates to computer networks.

BACKGROUND

In a typical cloud-based data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Devices of data centers are often arranged according to an interconnected topology, such as an Internet protocol Clos (IP-Clos) network. An IP-Clos network may be configured according to Ethernet VPN Virtual Extensible LAN (EVPN VxLAN). Data centers may also provide services for multiple tenants, and generally provide tenant isolation to prevent data of one tenant from being accessible to other tenants. Some devices of a data center may provide physical network functions (PNFs). In order to provide PNFs to inter-tenant communication, such devices are typically configured manually using device-specific and/or vender-specific configuration procedures.

SUMMARY

In general, this disclosure describes techniques for performing physical network function (PNF) service chaining in a data center. In particular, this disclosure describes techniques for automating configuration and architecture of network devices in the data center to provide PNFs in the forwarding path across tenants of the data center. These techniques may greatly simplify the architecture of devices and the network of the data center, as it may extend constructs and configurations already widely used in data center IP-Clos networks using, e.g., Ethernet VPN Virtual Extensible LAN (EVPN VxLAN), to apply for inter-tenant service chaining through any generic PNF. This architecture also allows a software defined network (SDN) controller to automate the configuration of inter-tenant service chaining, without requiring any user manual intervention, e.g., via command line interface (CLI).

The techniques of this disclosure may thereby offer various benefits. For example, these techniques can automate configuration while leveraging open and widely adopted standards, such as EVPN VxLAN constructs and capabilities. These techniques may also be applied to any type of PNF. These techniques may natively support PNF multi-homing on multiple devices, allowing for scaling and redundancy of services a PNF delivers. These techniques also support PNF high availability.

In one example, a data center system includes a first set of one or more server devices of the data center, the first set of server devices hosting data of a first tenant of the data center; a first network device of an interconnected topology communicatively coupled to the first set of one or more server devices, the first network device including a first service virtual routing and forwarding (VRF) table for the first set of server devices; a second set of one or more server devices of the data center, the second set of server devices hosting data of a second tenant of the data center; a second network device of the interconnected topology communicatively coupled to the second set of one or more server devices, the second leaf node device including a second VRF table for the second set of server devices; and one or more service devices that communicatively couple the first network device to the second network device, wherein the service devices include a third service VRF table for the first tenant and a fourth service VRF table for the second tenant, wherein the first network device applies the first service VRF table to network traffic flowing between the first set of server devices and the second set of server devices, wherein the second network device applies the second service VRF table to the network traffic flowing between the first set of server devices and the second set of server devices, and wherein the service devices apply services to the network traffic flowing between the first set of server devices and the second set of server devices using the third service VRF table and the fourth service VRF table.

In another example, a method includes configuring, by a virtual network controller device of a data center network, a first set of one or more server devices of the data center to host data of a first tenant of the data center; configuring, by the virtual network controller device, a second set of one or more server devices of the data center to host data of a second tenant of the data center; configuring, by the virtual network controller device, a first network device of an interconnected topology communicatively coupled to the first set of one or more server devices to include a first service virtual routing and forwarding (VRF) table for the first set of server devices and to apply the first VRF table to network traffic flowing between the first set of server devices and the second set of server devices; configuring, by the virtual network controller device, a second network device of the interconnected topology communicatively coupled to the second set of one or more server devices to include a second service VRF table for the second set of server devices and to apply the second VRF table to network traffic flowing between the first set of server devices and the second set of server devices; and configuring, by the virtual network controller device, one or more service devices to communicatively couple the first network device to the second network device, wherein configuring the one or more service devices comprises configuring the service devices to include a third VRF table for the first set of server devices and a fourth service VRF table for the second set of network devices, and configuring the service devices to apply services to network traffic flowing between the first set of server devices and the second set of server devices using the third service VRF table and the fourth service VRF table.

In another example, a computer-readable storage medium has stored thereon instructions that, when executed, cause a processor of a virtual network controller device of a data center network to configure a first set of one or more server devices of the data center to host data of a first tenant of the data center; configure a second set of one or more server devices of the data center to host data of a second tenant of the data center; configure a first network device of an interconnected topology communicatively coupled to the first set of one or more server devices to include a first service virtual routing and forwarding (VRF) table for the first set of server devices and to apply the first VRF table to network traffic flowing between the first set of server devices and the second set of server devices; configure a second network device of the interconnected topology communicatively coupled to the second set of one or more server devices to include a second service VRF table for the second set of server devices and to apply the second VRF table to network traffic flowing between the first set of server devices and the second set of server devices; and configure one or more service devices to communicatively couple the first network device to the second network device, wherein the instructions that cause the processor to configure the one or more service devices comprise instructions that cause the processor to configure the service devices to include a third VRF table for the first set of server devices and a fourth service VRF table for the second set of network devices, and to configure the service devices to apply services to network traffic flowing between the first set of server devices and the second set of server devices using the third service VRF table and the fourth service VRF table.

The details of one or more examples are set forth in the accompanying drawings and the description below. Other features, objects, and advantages will be apparent from the description and drawings, and from the claims.

DETAILED DESCRIPTION

Figure 1:
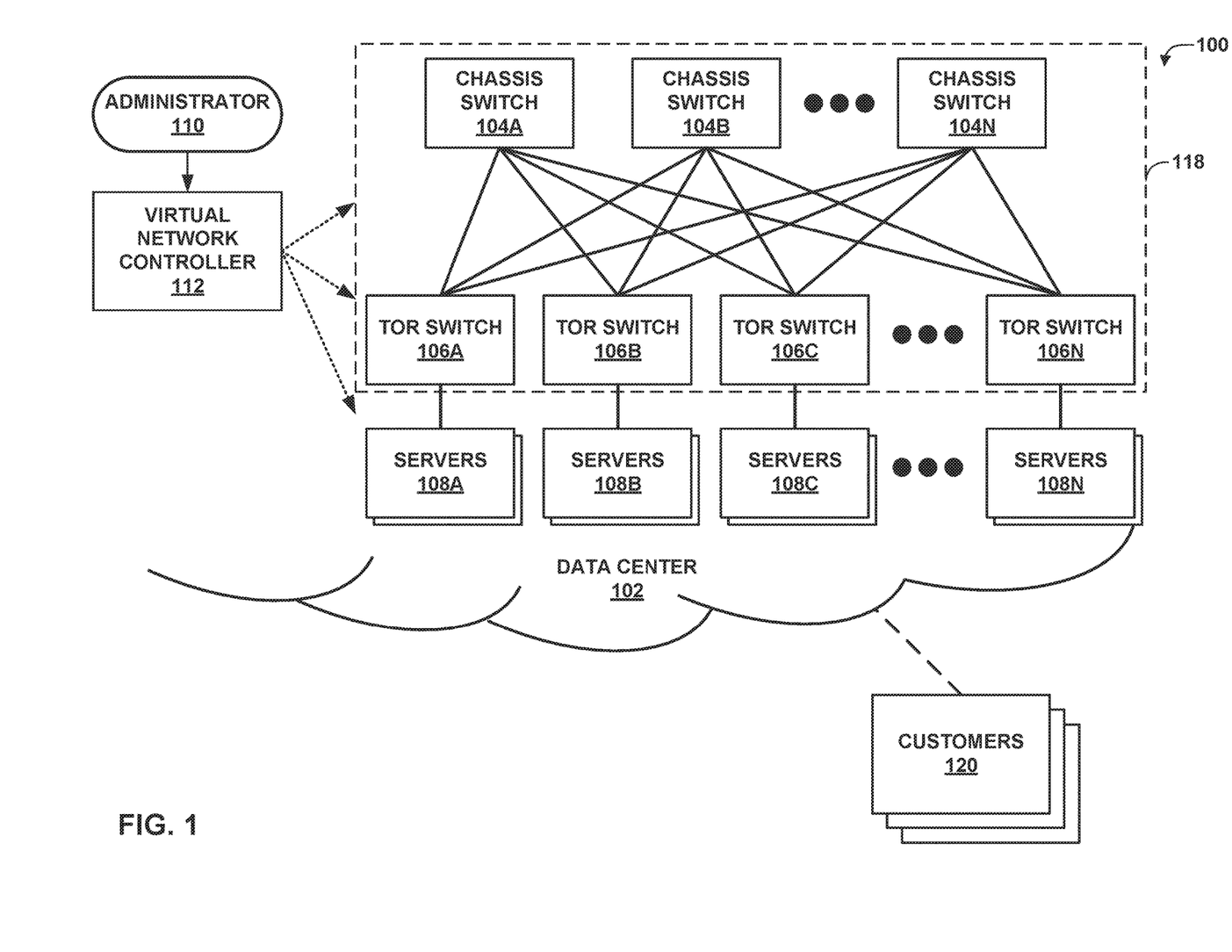
FIG. 1 is a block diagram illustrating an example network including a data center in which examples of the techniques described herein may be implemented.

FIG. 1 is a block diagram illustrating an example network 100 including a data center 102 in which examples of the techniques described herein may be implemented. In general, data center 102 provides an operating environment for applications and services for customers 120 coupled to the data center, e.g., by a service provider network (not shown). Data center 102 may, for example, host infrastructure equipment, such as networking and storage systems, redundant power supplies, and environmental controls. A service provider network that couples customers 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the examples of FIG. 1, data center 102 may be a facility that provides network services for customers 120. Customers 120 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 102 may be individual network servers, network peers, or otherwise.

In this example, data center 102 includes a set of storage systems and application servers 108A-108N (servers 108) interconnected via interconnected topology 118, which may comprise a switch fabric provided by one or more tiers of physical network switches and routers. Servers 108 may be respective bare metal servers (BMSs). In the examples of FIG. 1, interconnected topology 118 includes chassis switches 104A-104N (chassis switches 104) and top-of-rack (TOR) switches 106A-106N (TOR switches 106). For instance, chassis switches 104 may form spine nodes of a spine and leaf topology, while TOR switches 106 may form leaf nodes of the spine and leaf topology. It should be understood that other topologies may be used in other examples, as discussed in greater detail below. Servers 108 provide execution and storage environments for applications and data associated with customers 120 and may be physical servers, virtual machines or combinations thereof.

In general, interconnected topology 118 represents layer two (L2) and (in some examples) layer three (L3) switching and routing components that provide point-to-point connectivity between servers 108. In one example, interconnected topology 118 comprises a set of interconnected, high-performance yet off-the-shelf packet-based routers and switches that implement industry standard protocols. In one example, interconnected topology 118 may comprise off-the-shelf components that provide Internet Protocol (IP) over an Ethernet (IPoE) point-to-point connectivity.

In FIG. 1, virtual network controller 112 provides a high-level controller for configuring and managing routing and switching infrastructure of data center 102. Details of virtual network controller 112 operating in conjunction with other devices of network 100 or other software-defined networks can be found in International Application Number PCT/US2013/044378, filed May 6, 2013, and in U.S. patent application Ser. No. 14/226,509, filed Mar. 26, 2014, and issued as U.S. Pat. No. 9,571,394, the entire contents of each of which are incorporated by reference. Virtual network controller 112 may represent, for example, a software defined network (SDN) controller that communicates and manages the devices of data center 102 using an SDN protocol, such as the OpenFlow protocol. Additional details regarding OpenFlow are found in "OpenFlow Switch Specification version 1.1.0", OpenFlow Consortium, February 2011, which is incorporated by reference herein. In addition, controller 112 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other node configuration interface.

Virtual network controller 112 provides a logically—and in some cases, physically—centralized controller for facilitating operation of one or more virtual networks within data center 102 in accordance with examples of this disclosure. In some examples, virtual network controller 112 may operate in response to configuration input received from network administrator 110. Additional information regarding virtual network controller 112 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

Although not shown, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, network traffic within interconnected topology 118, such as packet flows between servers 108, can traverse the physical network of interconnected topology 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As shown in the examples of FIG. 1, each of TOR switches 106 is communicatively coupled to each of chassis switches 104 in interconnected topology 118. Similarly, in this example, each of chassis switches 104 is communicatively coupled to each of TOR switches 106. Accordingly, the number of paths from any one of TOR switches 106 to any other one of TOR switches 106 is equal to the number of chassis switches 104, in this example. Although the letter "N" is used to represent undefined numbers of both TOR switches 106 and chassis switches 104, it should be understood that there may be a different of TOR switches 106 than chassis switches 104.

In the examples of FIG. 1, interconnected topology 118 allows for multi-path forwarding. Multi-path forwarding has been deployed in various levels and scales of networks as a way to increase network capacity and resiliency. Developments have been made to multi-path systems to determine how to achieve balanced redistribution of traffic among the multiple paths and how to avoid packet reordering while packets are travelling on the different paths. TOR switches 106 may utilize hash tables to prevent packet reordering for a particular flow, as described in greater detail below. In general, to prevent packet reordering, once a flow is assigned to a path through interconnected topology 118, all packets of the flow are sent along the same path. However, as also discussed in greater detail below, the techniques of this disclosure include moving a flow from one path to another through interconnected topology 118 while also preventing packet reordering.

Servers 108 may correspond to respective tenants of data center 102. For example, servers 108A may correspond to a first tenant, servers 108B may correspond to a second tenant, and so on. Interconnected topology 118 allows for inter-tenant communication, e.g., between servers 108A-108N. In accordance with the techniques of this disclosure, virtual network controller 112 may be configured to automatically configure one or more service devices to provide physical network functions (PNFs) to inter-tenant communications. The service devices may be, for example, TOR switches 106, chassis switches 104, or other devices connected thereto. In general, the service devices may be any International Organization for Standardization (ISO) Open Systems Interconnection (OSI) model Layer 3 Virtual Extensible LAN (VxLAN) Network Identifier (VNI) capable devices, which may be configured in active-active mode.

In general, virtual network controller 112 may configure the service devices to have service virtual routing and forwarding (VRF) tables specific to each set of tenant devices. For example, when servers 108A host data for a first tenant and servers 108B host data for a second tenant, chassis switches 104 may each have a first service VRF table for servers 108A and a second service VRF table for servers 108B. In this manner, when chassis switch 104A receives a network communication (e.g., a packet) from one of servers 108A destined for one of servers 108B, chassis switch 104A may apply the first service VRF table to the packet to determine one or more PNFs to apply to the packet. The PNFs may be, for example, firewall services, intrusion detection and prevention (IDP) services, load balancing services, or the like.

In some examples, virtual network controller 112 receives a high level configuration for the various network devices, e.g., from administrator 110, and translates the high level configuration into low level configuration data. The high level configuration data may be vendor-neutral, whereas the low level configuration data may be vendor-specific, and thus, executable or otherwise usable by each respective one of chassis switches 104, TOR switches 106, and servers 108. Details regarding translation of configuration data from high level configuration to low level configuration are explained in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference.

The first service VRF table may identify an output interface (e.g., a logical interface or a physical interface) associated with a service device of chassis switch 104A that performs the service. The output interface may direct traffic from a forwarding plane of chassis switch 104A to a service plane in which the service device is positioned, or to an external service device. In either case, chassis switch 104A may direct the traffic to the output interface to cause the service device to perform the service. In some examples, multiple services may be performed by one or more service devices. Ultimately, chassis switch 104A may receive the processed traffic back from the service device(s), and use the second VRF table to determine an output interface by which to output the processed traffic to reach servers 108B.

Interconnected topology 118 may be implemented in various ways, and does not necessarily include the devices or arrangement shown in FIG. 1. In one example, interconnected topology 118 is implemented as a spine and leaf topology. In such an example, chassis switches 104 are configured as spine switches (e.g., Layer 3 switches) and TOR switches 106 are configured as leaf switches.

Figure 2:
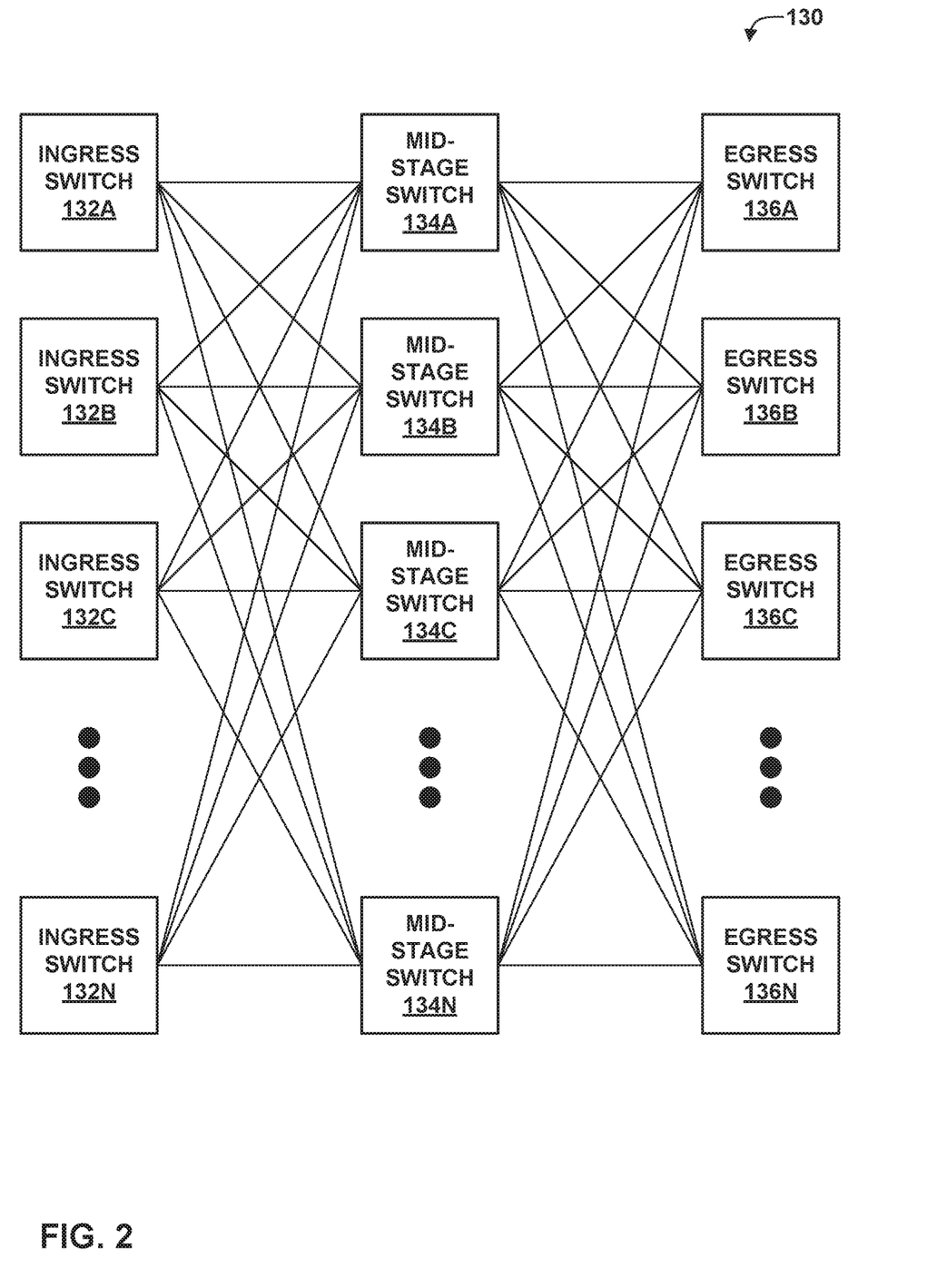
FIG. 2 is a block diagram illustrating an example Clos network.

In another example, interconnected topology 118 is implemented as a Clos network with three or more stages. A spine and leaf network is functionally similar to a three-stage Clos network, and therefore, spine and leaf networks are sometimes referred to as folded three-stage Clos networks. In general, Clos networks include three or more stages: an ingress stage, one or more mid-stages, and an egress stage. Nodes of each stage are connected to each node of each neighboring stage. For example, each node of the ingress stage is connected to each node of the first mid-stage, and each node of the last mid-stage (which is also the first mid-stage in a three-stage Clos network) is connected to each node of the egress stage. An example Clos network is shown in FIG. 2, as discussed in greater detail below.

In another example, interconnected topology 118 is implemented as a Virtual Chassis Fabric (VCF), e.g., as explained in Yafan An, "Tiers in Virtual Chassis Fabric," Oct. 30, 2013, available at http://forums.juniper.net/t5/Data-Center-Technologists/Tiers-in-Virtual-Chassis-Fabric/ba-p/214765. A VCF allows interconnected topology 118 to be managed as a single device, e.g., by virtual network controller 112. One example VCF implementation may be realized using four QFX5100-24Q switches from Juniper Networks, Inc., Sunnyvale, Calif. as spine switches and sixteen QFX5100-48S switches from Juniper Networks, Inc., Sunnyvale, Calif. as leaf switches. In this example, the spine switches support 48×10 Gigabit Ethernet (GbE) and 6×40 GbE interfaces, while each leaf uses 4×40 GbE interfaces as uplinks to the spine switches. This creates an oversubscription of 480:160 or 3:1 per leaf, in this example. Each leaf supports 48×10 GbE interfaces, such that the total port count is 768×10 GbE with 3:1 oversubscription.

In another example, interconnected topology 118 is implemented as an Internet protocol (IP) Fabric. An IP Fabric is made up of routing devices implementing Border Gateway Protocol (BGP), and each of the routing devices is a BGP neighbor to each of the other devices in the IP Fabric. An example IP Fabric can be formed from four Juniper Networks QFX5100-24Q switches as spine switches and QFX5100-96S switches, available from Juniper Networks, Inc., Sunnyvale, Calif., as leaf switches. Such an arrangement results in an IP Fabric of 3072×10 GbE usable ports. The leaves are constructed using the QFX5100-96S, and 8×40 GbE interfaces are used as uplinks into the spine, in this example. Because each leaf has eight uplinks into the spine, the maximum width of the spine is eight in this example. Each 40 GbE interface per leaf connects to a separate spine-thus, each leaf consumes one 40 GbE interface per spine. To calculate the maximum size of the IP Fabric, the number of server interfaces is multiplied by the number of leaves supported by the spine.

In yet another example, rather than interconnected topology 118 of FIG. 1, servers 108 may be connected by an interconnected topology according to IEEE 802.1BR. In accordance with IEEE 802.1BR, interconnected topology 118 may instead include two spine switches, multiple leaf nodes, and two or more satellite switches, such that there are two or more paths from any satellite switch to any other satellite switch. For example, in accordance with IEEE 802.1BR, there may be two controlling bridges in the position of chassis switches 104 and a plurality of port extenders in the position of TOR switches 106, interconnected as shown in interconnected topology 118.

In this manner, network 100 represents an example of a data center network including a first set of one or more server devices of the data center, the first set of server devices hosting data of a first tenant of the data center; a first network device of an interconnected topology communicatively coupled to the first set of one or more server devices, the first network device including a first service virtual routing and forwarding (VRF) table for the first set of server devices; a second set of one or more server devices of the data center, the second set of server devices hosting data of a second tenant of the data center; a second network device of the interconnected topology communicatively coupled to the second set of one or more server devices, the second leaf node device including a second VRF table for the second set of server devices; and one or more service devices that communicatively couple the first network device to the second network device, wherein the service devices include a third service VRF table for the first tenant and a fourth service VRF table for the second tenant, wherein the first network device applies the first service VRF table to network traffic flowing between the first set of server devices and the second set of server devices, wherein the second network device applies the second service VRF table to the network traffic flowing between the first set of server devices and the second set of server devices, and wherein the service devices apply services to the network traffic flowing between the first set of server devices and the second set of server devices using the third service VRF table and the fourth service VRF table.

FIG. 2 is a block diagram illustrating an example Clos network 130. Clos network 130, or a similar Clos network, may be used in place of interconnected topology 118 of FIG. 1. Clos network 130 includes three stages of switches: ingress switches 132A-132N (ingress switches 132), mid-stage switches 134A-134N (mid-stage switches 134), and egress switches 136A-136N (egress switches 136). Although the letter "N" is used to designate a variable number for each of ingress switches 132, mid-stage switches 134, and egress switches 136, it should be understood that the number of switches included in each stage is not necessarily the same. That is, there may be different numbers of ingress switches 132, mid-stage switches 134, and egress switches 136. Furthermore, although Clos network 130 includes three stages, it should be understood that a general Clos network may include any number of stages.

Figure 3:
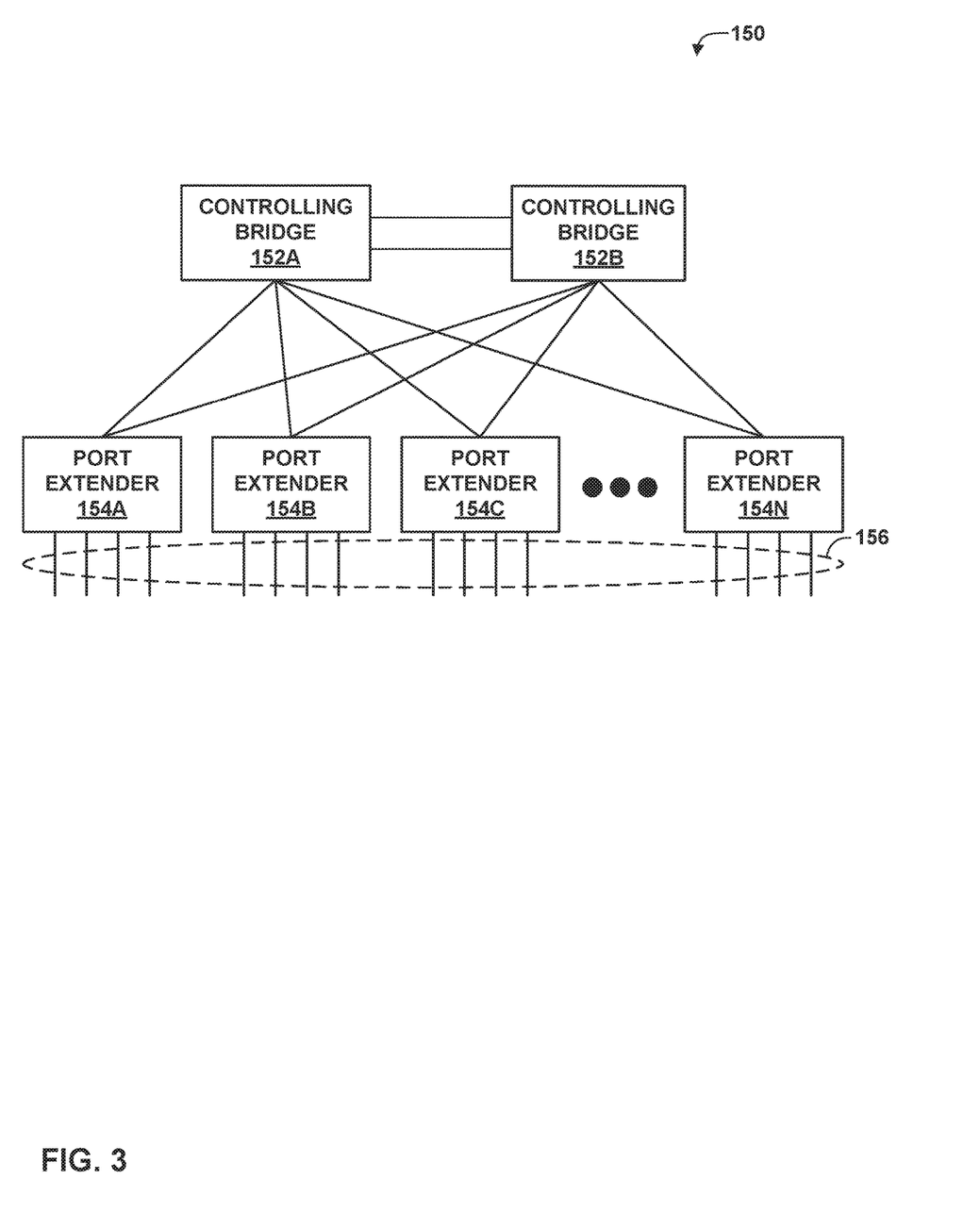
FIG. 3 is a block diagram illustrating an example IEEE 802.1BR network with a multi-chassis link aggregation group (LAG) for resilient multi-pathing.

FIG. 3 is a block diagram illustrating an example IEEE 802.1BR network 150 with a multi-chassis link aggregation group (LAG) for resilient multi-pathing. Network 150 may be used in place of interconnected topology 118 of FIG. 1. Network 150 includes two controlling bridges 150, which are coupled to each other and to a plurality of port extender devices 154A-154N (port extenders 154). Network 150 provides extended ports 156. That is, each of port extenders 154 includes a plurality of ports. Although four ports are shown in FIG. 3, it should be understood that each of port extenders 154 may have any number of ports.

Figure 4:
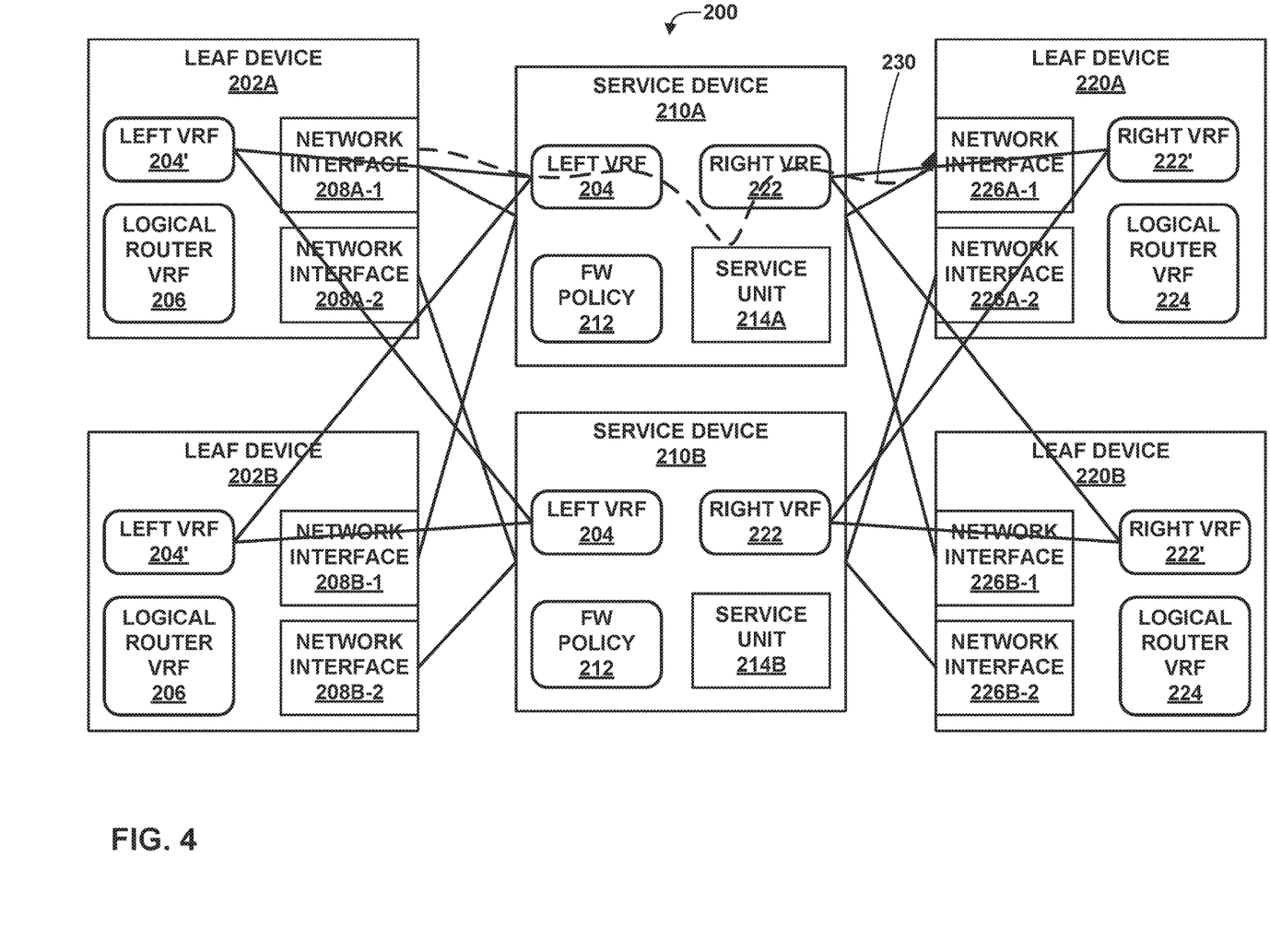
FIG. 4 is a block diagram illustrating an example network system including spine and leaf network devices configured to perform techniques of this disclosure.

FIG. 4 is a block diagram illustrating an example network system 200 including spine and leaf network devices configured to perform techniques of this disclosure. In particular, network system 200 includes leaf devices 202A, 202B, 220A, and 220B (leaf devices 202, 220), as well as service devices 210A, 210B (service devices 210). Service devices 210 may correspond to spine devices of a spine and leaf topology, such as chassis switches 104 or TOR switches 106 of FIG. 1, mid-stage switches 134 of FIG. 2, or controlling bridges 152 of FIG. 3. Leaf devices 202, 220 may correspond to leaf devices of the spine and leaf topology, such as TOR switches 106 or servers 108 of FIG. 1, ingress switches 132 and egress switches 136 of FIG. 2, or port extenders 154 of FIG. 3. Although in the example of FIG. 4 leaf devices are shown, it should be understood that in other examples, spine devices may be coupled to service devices 210, e.g., as explained with respect to FIG. 5 below.

In this example, leaf devices 202 may be referred to as "left" devices, while leaf devices 220 may be referred to as "right" devices. Accordingly, leaf devices 202 include left virtual routing and forwarding (VRF) table 204', while leaf devices 220 include right VRF table 222'. Likewise, service devices 210, in this example, include left VRF table 204 and right VRF table 222. Furthermore, in leaf devices 202, left VRF table 204' is separate from logical router VRF table 206, while in leaf devices 220, right VRF table 222' is separate from logical router VRF table 224. Similarly, left VRF table 204 and right VRF table 222 of service devices 210 are separate from forwarding (FW) policy 212.

Moreover, leaf devices 202 may correspond to one tenant of a data center including system 200, while leaf devices 220 may correspond to a different of the data center. Thus, logical router VRF table 206 may include data for forwarding network traffic in one or more bridge domains associated with one tenant, while logical router VRF table 224 may include data for forwarding network traffic in one or more different bridge domains associated with a different tenant.

Leaf devices 202, 220 also include respective network interfaces, such as network interface cards (NICs) that may, e.g., operate according to the Ethernet protocol or aggregated Ethernet protocol. In particular, leaf device 202A includes network interfaces 208A-1 and 208A-2, leaf device 202B includes network interfaces 208B-1 and 208B-2, leaf device 220A includes network interfaces 226A-1 and 226A-2, and leaf device 220B includes network interfaces 226B-1 and 226B-2. Although not shown in FIG. 4 for brevity, service devices 210 should also be understood to include respective network interfaces. In this example, network interfaces 208A-1 and 208B-1 are coupled to a network interface of service device 210A, while network interfaces 208A-2 and 208B-2 are coupled to a network interface of service device 210B. Similarly, network interfaces 226A-1 and 226B-1 are coupled to a network interface of service device 210A, while network interfaces 226A-2 and 226B-2 are coupled to a network interface of service device 210B.

Service devices 210 include respective service units 214A, 214B (service units 214) that perform physical network layer (PNF) functions on packets. Such services may include, for example, a firewall service, an intrusion detection and prevention (IDP) service, a quality of service (QoS) service, a load balancing service, or the like.

Service devices 210 may be International Organization for Standardization (ISO) Open Systems Interconnection (OSI) model Layer 3 Virtual Extensible LAN (VxLAN) Network Identifier (VNI) capable devices configured in active-active mode, in accordance with the techniques of this disclosure.

As shown in the example of FIG. 4, service device 210A includes, for example, left VRF table 204 and right VRF table 222, which are separate from FW policy 212. Because left VRF table 204 and right VRF table 222 are used for performing services on inter-tenant communications, left VRF table 204 and right VRF table 222 may be referred to as "service VRFs." A single virtual local area network (VLAN) and an associated bridge domain (VxLAN VNI) may be configured for such service VRFs on access ports to service devices 210. In this manner, service device 210A may perform services on inter-tenant communications. For example, leaf device 202A (corresponding to one tenant) may send packet 230 to leaf device 220A (corresponding to a different tenant). In particular, in order to send packet 230 to leaf device 220A, leaf device 202A may use left VRF table 204' to determine a next hop to which to direct packet 230 to reach leaf device 220A, rather than logical router VRF table 206. Logical router VRF table 206 may include data for reaching devices external to the data center, such as customers 120 of FIG. 1.

Accordingly, when service device 210A receives packet 230, service device 210A may initially use left VRF table 204 to determine a device to which to forward packet 230. In this example, left VRF table 204 may indicate that a packet received from leaf device 202A destined for leaf device 220A is to have a particular service performed, e.g., by 214A. That is, left VRF table 204 of service device 210A may define a logical interface by which to forward packet 230 to reach service unit 214. Service unit 214A may then perform one or more services on packet 230.

After performing the services, service unit 214A may forward packet 230 via a logical interface, by which service device 210A receives the packet, e.g., in a forwarding plane of service device 210A. Service device 210A may then use right VRF table 222 to determine an interface by which to send packet 230. In this example, right VRF table 222 indicates that packet 230 is to be forwarded via the network interface of service device 210A that is coupled to leaf device 220A. Thus, service device 210A forwards the packet to leaf device 220A.

Although not shown in FIG. 4, it should be understood that system 200 may further include a software defined network (SDN) controller, such as virtual network controller 112 of FIG. 1. The SDN controller may configure leaf devices 202, 220 and service devices 210, e.g., by configuring left VRF tables 204, 204', right VRF tables 222, 222', logical router VRF 206, and FW policy 212, to cause service devices 210 to apply one or more PNFs to inter-tenant communications using service units 214.

Although service devices 210 are shown as including service units 214A, 214B, it should be understood that in other examples, service units 214A, 214B may be included in one or more separate devices that are communicatively coupled to service devices 210.

In some examples, service devices 210 may correspond to a service appliance including four PNFs, two in active/active mode and two in a redundant cluster, which may be treated as part of the service appliance itself. Spine devices where the PNFs are attached may be configured in the role of a service chaining gateway. Such spine devices may be a subset of all devices with roles as a centrally routed bridging gateway (CRB-GW) or an edge routed bridging gateway (ERB-GW). Ethernet VPN (EVPN) Ethernet Segment Identifier multihoming may be used between service devices 210 and spine devices. That is, an SDN controller, such as virtual network controller 112, may configure service devices 210 and the spine devices to use EVPN Ethernet segment Identifier multihoming.

An integrated routing and bridging (IRB) feature may be configured in left VRF tables 204, 204' and right VRF tables 222, 222', both in leaf devices 202, 220 and in service devices 210. For example, an SDN controller may configure left VRF tables 204, 204' and right VRF tables 222, 222' to include an IRB feature. Leaf devices 202, 220 and service devices 210 may use the IRB as an Inet-BGP loopback. Service devices 210 may also (additionally or alternatively) use a loopback address (LO0) as the Inet-BGP loopback. In some examples, firewall policies of service devices 210 may dictate that network communications received from leaf devices 202 are to be sent to one of leaf devices 220, while network communications received from leaf devices 220 are to be sent to one of leaf devices 202. There may be a need for an Inet-BGP session on service devices 210 between left VRF table 204 and right VRF table 222.

In this manner, system 200 of FIG. 4 represents an example of a data center system including a first set of one or more server devices of the data center, the first set of server devices hosting data of a first tenant of the data center; a first network device of an interconnected topology communicatively coupled to the first set of one or more server devices, the first network device including a first service virtual routing and forwarding (VRF) table for the first set of server devices; a second set of one or more server devices of the data center, the second set of server devices hosting data of a second tenant of the data center; a second network device of the interconnected topology communicatively coupled to the second set of one or more server devices, the second leaf node device including a second VRF table for the second set of server devices; and one or more service devices that communicatively couple the first network device to the second network device, wherein the service devices include a third service VRF table for the first tenant and a fourth service VRF table for the second tenant, wherein the first network device applies the first service VRF table to network traffic flowing between the first set of server devices and the second set of server devices, wherein the second network device applies the second service VRF table to the network traffic flowing between the first set of server devices and the second set of server devices, and wherein the service devices apply services to the network traffic flowing between the first set of server devices and the second set of server devices using the third service VRF table and the fourth service VRF table.

Figure 5:
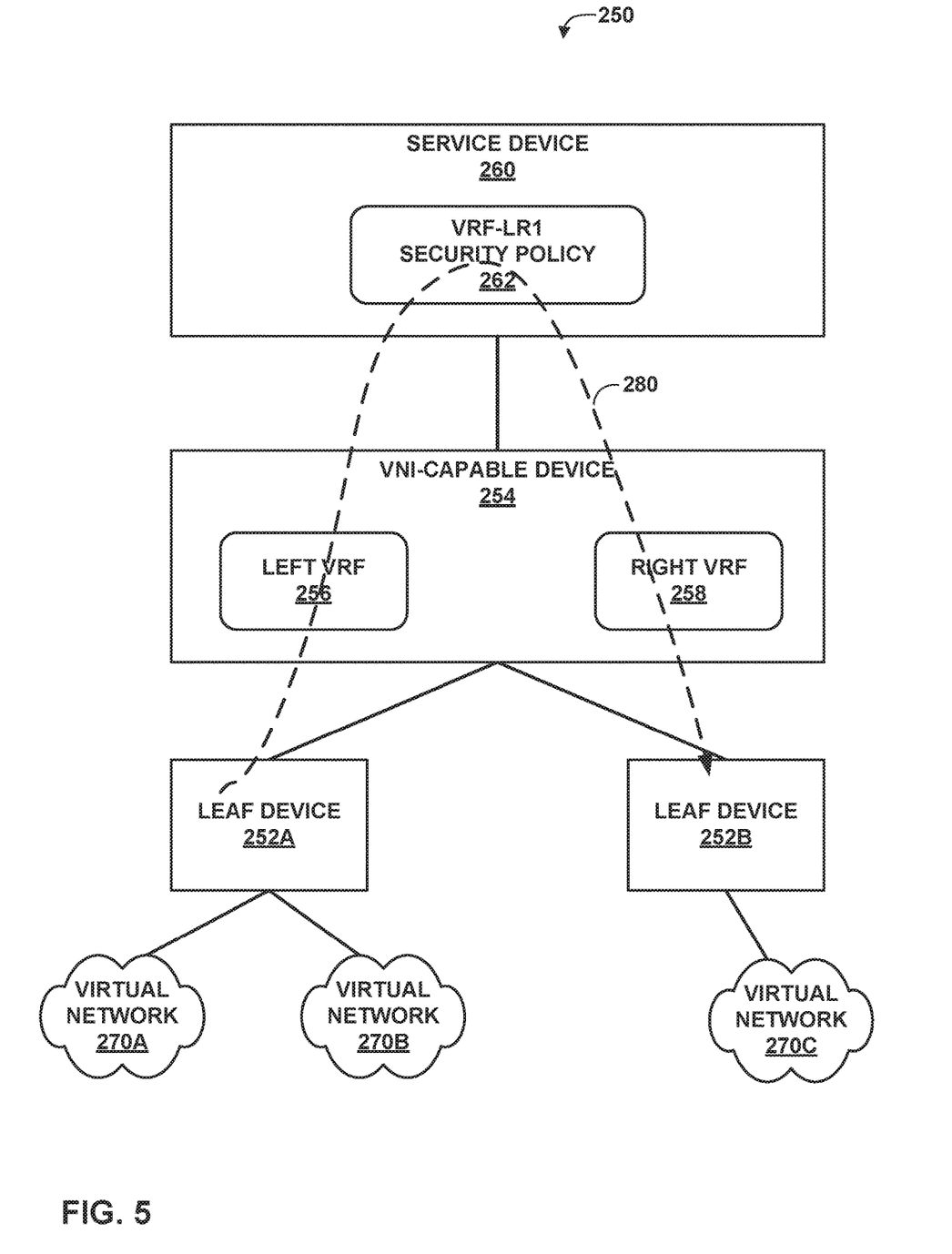
FIG. 5 is a block diagram illustrating an example system 250 including another example set of devices of a data center that may perform the techniques of this disclosure.

FIG. 5 is a block diagram illustrating an example system 250 including another example set of devices of a data center that may perform the techniques of this disclosure. In this example, system 250 includes leaf devices 252A, 252B, Virtual Extensible LAN (VxLAN) Network Identifier (VNI) capable device 254, and service device 260. Leaf device 252A is coupled to virtual networks 270A, 270B, while leaf device 252B is coupled to virtual network 270C. VNI capable device 254 may correspond to a TOR switch or a spine switch, e.g., one of TOR switches 106 or chassis switches 104 of FIG. 1. Leaf devices 252 may correspond to, for example, servers 108 of FIG. 1.

As noted above with respect to FIG. 4, in some examples, a service device may be separate from a Layer 3 VNI capable device. In the example of FIG. 5, service device 260 is separate from VNI-capable device 254. Service device 260 may represent one of a plurality of service devices (e.g., as shown in FIG. 4), and VNI-capable device 254 may represent one of a plurality of VNI-capable devices. Moreover, the plurality of service devices may be communicatively coupled to the plurality of VNI-capable devices in active-active mode.

In general, leaf device 252A and virtual networks 270A, 270B correspond to one tenant, while leaf device 252B and virtual network 270C correspond to a different tenant. Leaf device 252A may send packet 280 to leaf device 252B, and thus, packet 280 represents an example of an inter-tenant network communication. In some examples, the tenants may be different cloud service providers.

In accordance with the techniques of this disclosure, VNI-capable device 254 is configured with left VRF table 256 for leaf device 252A and right VRF table 258 for leaf device 252B. Left VRF table 256 and right VRF table 258 represent examples of service VRFs that are distinct VRFs from tenant VRFs (not shown). When VNI-capable device 254 receives packet 280, VNI-capable device 254 performs a lookup in left VRF table 256, and determines that packet 280 is to be sent to service device 260 to have one or more PNFs applied. Service device 260 may then perform the one or more PNFs on packet 280. VRF-LR1 and security policy 262 of service device 260 may define one or more security policies for a firewall PNF, for example.

Service device 260 may then send packet 280 back to VNI-capable device 254 per a lookup in VRF-LR1 security policy 262, assuming packet 280 does not match any elements of a security policy of VRF-LR1 security policy 262 indicating that packet 280 is to be dropped. VNI-capable device 254 receives packet 280 from security device 260 and performs a lookup in right VRF table 258. Right VRF table 258 indicates that packet 280 is to be sent to leaf device 252B, and thus, VNI-capable device 254 forwards packet 280 to leaf device 252B.

In some examples, an SDN controller (not shown) of system 250 (e.g., corresponding to virtual network controller 112 of FIG. 1) is configured to receive data from an administrator (e.g., administrator 110 of FIG. 1) representing whether to use BGP between VNI-capable device 254 and service device 260 (including a PNF routing instance) or to configure static routes to divert traffic from VNI-capable device 254 and service device 260. In some examples, additionally or alternatively, the SDN controller is configured to receive data from the administrator representing whether service left VRF table 256 and right VRF table 258 are shared with logical router VRF tables of, e.g., leaf devices 252. In general, the SDN controller may further configure the various devices of system 250 according to the discussion above. For example, the SDN controller may receive high level configuration data for the various devices, and translate the high level configuration data to low level (that is, device-level) configuration data.

In this manner, system 250 of FIG. 5 represents an example of a data center system including a first set of one or more server devices of the data center, the first set of server devices hosting data of a first tenant of the data center; a first network device of an interconnected topology communicatively coupled to the first set of one or more server devices, the first network device including a first service virtual routing and forwarding (VRF) table for the first set of server devices; a second set of one or more server devices of the data center, the second set of server devices hosting data of a second tenant of the data center; a second network device of the interconnected topology communicatively coupled to the second set of one or more server devices, the second leaf node device including a second VRF table for the second set of server devices; and one or more service devices that communicatively couple the first network device to the second network device, wherein the service devices include a third service VRF table for the first tenant and a fourth service VRF table for the second tenant, wherein the first network device applies the first service VRF table to network traffic flowing between the first set of server devices and the second set of server devices, wherein the second network device applies the second service VRF table to the network traffic flowing between the first set of server devices and the second set of server devices, and wherein the service devices apply services to the network traffic flowing between the first set of server devices and the second set of server devices using the third service VRF table and the fourth service VRF table.

Further details of examples of configuration of the devices of system 250 are discussed in "contrail-specs/5.1/cfm-le-pnf-support.md," Nov. 12, 2018, available at github.com/Juniper/contrail-specs/blob/master/5.1/cfm-13-pnf-support.md, which is incorporated herein by reference in its entirety, and is the inventors' own publication.

Figure 6:
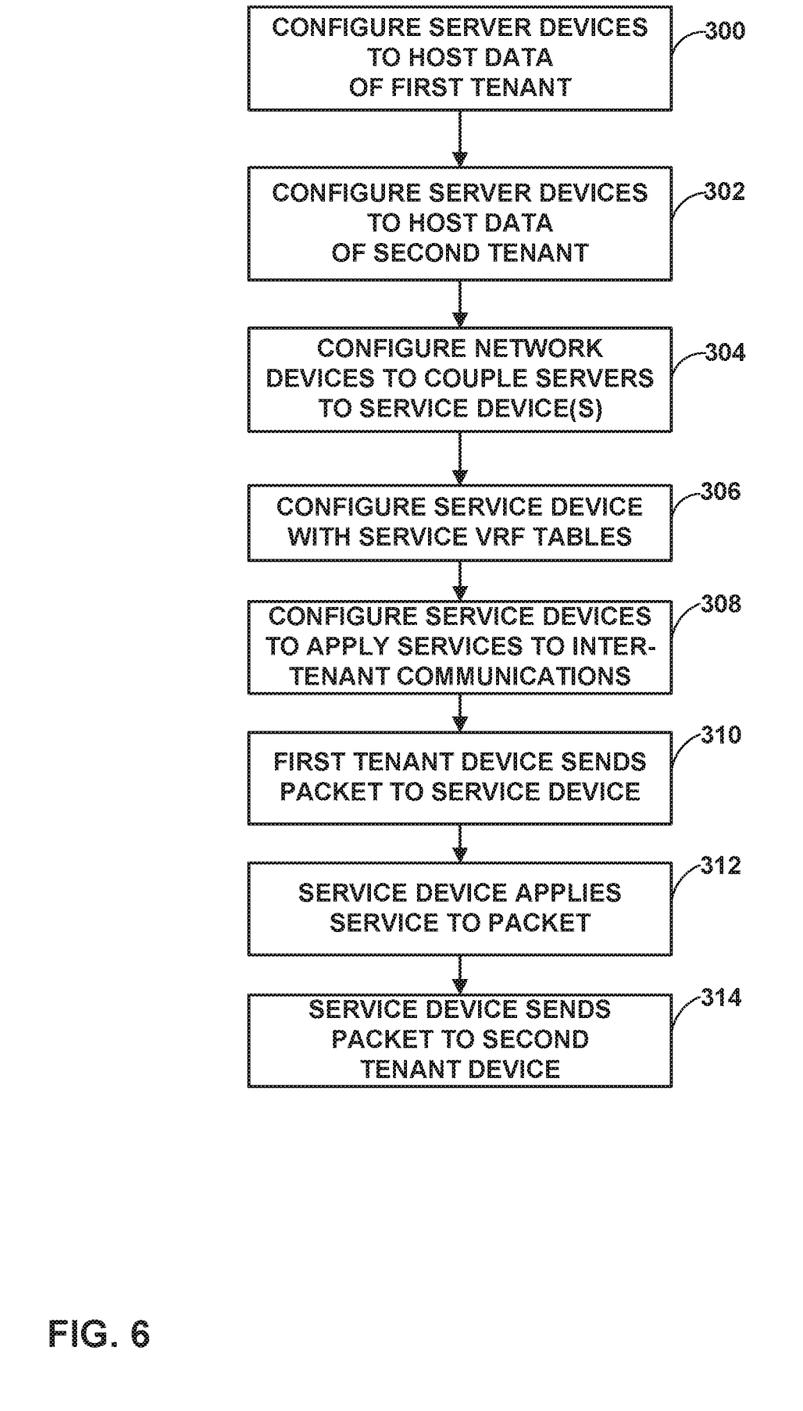
FIG. 6 is a flowchart illustrating an example method for performing techniques of this disclosure.

FIG. 6 is a flowchart illustrating an example method for performing techniques of this disclosure. Various portions of the method of FIG. 6 are attributed to virtual network controller 112, chassis switches 104, TOR switches 106, and servers 108, although it should be understood that other devices may perform these and other elements of the method. For example, the devices of FIGS. 2-5 may be configured to perform these or other functions, as discussed above.

Initially, virtual network controller 112 configures a first set of server devices (e.g., servers 108A of FIG. 1) to host data of a first tenant of a data center (300). For example, virtual network controller 112 may configure servers 108A to serve data of one or more bridge domains associated with the first tenant. Virtual network controller 112 also configures a second set of server devices (e.g., servers 108B of FIG. 1) to host data of a second tenant of the data center (302). For example, virtual network controller 112 may configure servers 108B to serve data of one or more bridge domains associated with the second tenant. Virtual network controller 112 also configures network devices of an interconnected topology (e.g., TOR switches 106 or chassis switches 104) to couple the server devices (e.g., servers 108A and 108B) to one or more service devices (304), such as service devices 210 of FIG. 4. In particular, virtual network controller 112 configures the network devices to include service virtual routing and forwarding (VRF) tables (e.g., left VRF table 204' and right VRF table 222' of FIG. 4).

Virtual network controller 112 then configures service devices (e.g., service devices 210 of FIG. 4)) with service VRF tables (306) for the first set of network devices and the second set of network devices. For example, as shown in FIG. 4, virtual network controller 112 may configure the service devices to include service left VRF table 204 and service right VRF table 222. Virtual network controller 112 may also configure the first and second sets of network devices to include respective service VRF tables that are separate from logical router VRF tables. That is, an administrator (e.g., administrator 110) may specify in high level configuration data that the service VRF tables are not to be shared (i.e., to be separate from the logical router VRF tables). When not shared, virtual network controller 112 may enable route leaking from logical router VRFs 206, 224 to left VRF table 204' and right VRF table 222'. Virtual network controller 112 may translate this high level configuration data to low level configuration data indicating that separate service left and right VRF tables are to be maintained by, e.g., servers 108, from logical router VRF tables (which servers 108 may use to communicate with customers 120 of FIG. 1).

Although in this example, it is assumed that the service devices include the service VRF tables, it should be understood that in other examples, such as in FIG. 5, virtual network controller 112 may configure a L3 VNI-capable device to include the service left and right VRF tables, and a separate service device may actually perform the service. In either case, virtual network controller 112 configures to the service devices to perform the service to inter-tenant communications (308). For example, virtual network controller 112 may configure the service devices to perform the service on packets flowing between servers 108A and 108B, in this example.

In light of such configuration, a first tenant device (e.g., one of servers 108A) sends a packet to the service device (310). For example, the first tenant device may determine that a service VRF thereof indicates that packets destined for one of servers 108B is to be sent to a service device (e.g., one of TOR switches 106 or chassis switches 104) that either performs the service (e.g., as in FIG. 4) or directs the packet to a device that performs the service (e.g., as in FIG. 5).

The service device then receives the packet and (using a service left VRF table associated with servers 108A, in this example) applies the service to the packet (312). For example, the service device may apply one or more firewall and/or IDP policies, QoS rules, load balancing rules, or the like to the packet. The service device then determines that the packet is to be sent to one of servers 108B (in this example) using, e.g., a service right VRF table associated with servers 108B. Accordingly, the service device forwards the packet to a second tenant device (314) (e.g., one of servers 108B).

In this manner, the method of FIG. 6 represents an example of a method including configuring, by a virtual network controller device of a data center network, a first set of one or more server devices of the data center to host data of a first tenant of the data center; configuring, by the virtual network controller device, a second set of one or more server devices of the data center to host data of a second tenant of the data center; configuring, by the virtual network controller device, a first network device of an interconnected topology communicatively coupled to the first set of one or more server devices to include a first service virtual routing and forwarding (VRF) table for the first set of server devices and to apply the first VRF table to network traffic flowing between the first set of server devices and the second set of server devices; configuring, by the virtual network controller device, a second network device of the interconnected topology communicatively coupled to the second set of one or more server devices to include a second service VRF table for the second set of server devices and to apply the second VRF table to network traffic flowing between the first set of server devices and the second set of server devices; and configuring, by the virtual network controller device, one or more service devices to communicatively couple the first network device to the second network device, wherein configuring the one or more service devices comprises configuring the service devices to include a third VRF table for the first set of server devices and a fourth service VRF table for the second set of network devices, and configuring the service devices to apply services to network traffic flowing between the first set of server devices and the second set of server devices using the third service VRF table and the fourth service VRF table.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A data center system comprising:
a first set of one or more server devices of the data center, the first set of server devices hosting data of a first tenant of the data center;
a first network switch of an interconnected switch fabric, wherein the first network switch is communicatively coupled to the first set of one or more server devices and includes a first virtual routing and forwarding (VRF) table for forwarding network traffic associated with the first set of server devices;
a second set of one or more server devices of the data center, the second set of server devices hosting data of a second tenant of the data center;
a second network switch of the interconnected switch fabric, wherein the second network switch is communicatively coupled to the second set of one or more server devices and includes a second VRF table for forwarding network traffic associated with the second set of server devices;
a third network switch communicatively coupled between the first network switch and the second network switch; and
one or more service units coupled to the third network switch and configured to apply services to the network traffic,
wherein the third network switch is configured with a set of service VRF tables to direct the network traffic through the one or more service units, and wherein the set of service VRF tables include a first service VRF table for forwarding network traffic through the one or more service units in a direction from the first network switch to the second network switch and a second service VRF table for forwarding network traffic through the one or more service units in a direction from the second network switch to the first network switch.

2. The data center system of claim 1, wherein the first VRF table is separate from a first tenant VRF table for the first tenant, and wherein the second VRF table is separate from a second tenant VRF table for the second tenant.

3. The data center system of claim 1, wherein the first and second network switches are International Organization for Standardization (ISO) Open Systems Interconnection (OSI) model Layer 3 Virtual Extensible LAN (VxLAN) Network Identifier (VNI) capable devices configured in active-active mode.

4. The data center system of claim 3, wherein the first and second network switches comprise at least one of top-of-rack (TOR) switches or Spine switches.

5. The data center system of claim 1, further comprising a virtual network controller device, wherein the virtual network controller is configured to translate high level configuration data received from a user to low level configuration data to configure the third network switch to include the first service VRF table and the second service VRF table to direct the network traffic through a service chain of the one or more service units.

6. The data center system of claim 5, wherein the virtual network controller device is configured to receive data from a user indicating whether a route advertised by a border gateway protocol (BGP) or a static route configuration is to be applied to divert network traffic from the third network switch to the service units.

7. The data center system of claim 5, wherein the virtual network controller device is configured to receive data from a user indicating whether the first and second service VRF tables are shared or not shared, wherein when the first and second service VRF tables are shared, the first and second service VRF tables are the same as the VRF tables of the first network switch or the second network switch, and wherein when the first and second service VRF tables are not shared, the first and second service VRF tables are distinct from the VRF tables of the first network switch and the second network switch.

8. The data center system of claim 1, wherein the services comprise one or more of a firewall service, an intrusion detection and prevention (IDP) service, or a load balancing service.

9. A method comprising:
configuring, by the virtual network controller device, a first network switch of an interconnected switch fabric to apply a first virtual routing and forwarding (VRF) table to network traffic flowing to and from a first set of server devices of a data center, wherein the first network switch is communicatively coupled to the first set of server devices;
configuring, by the virtual network controller device, a second network switch of the interconnected switch fabric to apply a second VRF table to network traffic flowing to and from a second set of server devices of the data center, wherein the second network switch is communicatively coupled to the second set of server devices; and
configuring, by the virtual network controller device, a third network switch communicatively coupled between the first network switch and the second network switch to include a set of service VRF tables for diverting the network traffic to a set of one or more service units for application of at least one service, wherein the set of service VRF tables includes a first service VRF table for forwarding network traffic through the one or more service units in a direction from the first network switch to the second network switch, and a second service VRF table for forwarding network traffic through the one or more service units in a direction from the second network switch to the first network switch.

10. The method of claim 9, wherein the first VRF table is separate from a first tenant VRF table for a first tenant of the data center, and wherein the second VRF table is separate from a second tenant VRF table for a second tenant of the data center.

11. The method of claim 9,
wherein the third network switch is an International Organization for Standardization (ISO) Open Systems Interconnection (OSI) model Layer 3 Virtual Extensible LAN (VxLAN) Network Identifier (VNI) capable device configured in active-active mode.

12. The method of claim 11, wherein the first and second network switches comprise at least one of top-of-rack (TOR) switches or Spine switches.

13. The method of claim 9, further comprising:
receiving, by the virtual network controller device, data from a user indicating whether border gateway protocol (BGP) is to be applied between the first network device and the service units device and between the second network device and the service device or to use a static route configuration is to be applied to divert network traffic from the first third network switch device to the service units device and from the second network device to the service devices; and
configuring, by the virtual network controller device, the third network switch in based on the data.

14. The method of claim 9, further comprising receiving, by the virtual network controller device, data from a user indicating whether the first and second service VRF tables are shared or not shared, wherein when the first and second service VRF tables are shared, the first and second service VRF tables are the same as the VRF tables of the first network switch or the second network switch, and wherein when the first and second service VRF tables are not shared, the first and second service VRF tables are distinct from the VRF tables of the first network switch and the second network switch.

15. A computer-readable storage medium having stored thereon instructions that, when executed, cause a processor of a virtual network controller device of a data center network to:
configure a first network device of an interconnected switch fabric, communicatively coupled to a first set of one or more server devices of the data center network, to include a first virtual routing and forwarding (VRF) table for the first set of server devices and to apply the first VRF table to network traffic flowing to and from the first set of server devices;
configure a second network device of the interconnected switch fabric, communicatively coupled to a second set of one or more server devices of the data center network, to include a second VRF table for the second set of server devices and to apply the second VRF table to network traffic flowing to and from the second set of server devices; and
configure a third network switch, communicatively coupled between the first network switch and the second network switch, to include a set of service VRF tables for diverting the network traffic to a set of one or more service units for application of at least one service, wherein the set of service VRF tables includes a first service VRF table for forwarding network traffic through the one or more service units in a direction from the first network switch to the second network switch, and a second service VRF table for forwarding network traffic through the one or more service units in a direction from the second network switch to the first network switch.

16. The computer-readable storage medium of claim 15, wherein the first VRF table is separate from a first tenant VRF table for a first tenant of the data center, and wherein the second VRF table is separate from a second tenant VRF table for a second tenant of the data center.

17. The computer-readable storage medium of claim 15, wherein the third network switch is an International Organization for Standardization (ISO) Open Systems Interconnection (OSI) model Layer 3 Virtual Extensible LAN (VxLAN) Network Identifier (VNI) capable device configured in active-active mode.

18. The computer-readable storage medium of claim 15, further comprising instructions that cause the processor to receive data from a user indicating whether the first and second service VRF tables are shared or not shared, wherein when the first and second service VRF tables are shared, the first and second service VRF tables are the same as the VRF tables of the first network switch or the second network switch, and wherein when the first and second service VRF tables are not shared, the first and second service VRF tables are distinct from the VRF tables of the first network switch and the second network switch.

19. The system of claim 1, wherein each of the first and second service VRF tables of the third network switch is configured to forward traffic through layer three (L3) virtual network interfaces (VNIs) associated with the third network switch coupled to the one or more service units.

20. The method of claim 9, further comprising configuring, by the virtual network controller device, the third network switch to connect to a plurality of the service units via an Ethernet VPN (EVPN) multi-homed arrangement.

* * * * *

UNITED STATES PATENT AND TRADEMARK OFFICE
CERTIFICATE OF CORRECTION

PATENT NO. : 10,897,420 B1  
APPLICATION NO. : 16/235993  
DATED : January 19, 2021  
INVENTOR(S) : Jacopo Pianigiani et al.

Page 1 of 1

It is certified that error appears in the above-identified patent and that said Letters Patent is hereby corrected as shown below:

In the Claims

Column 16, Claim 9, Line number 43, Replace "by the virtual network controller device" with --by a virtual network controller device--

Column 17, Claim 13, Line number 22, Replace "the service units device and between" with --the service units and between--

Column 17, Claim 13, Line number 23, Replace "and the service units device or to use" with --and the service units or to use--

Column 17, Claim 13, Line number 29, Replace "switch in based on the data." with --switch based on the received data.--

Signed and Sealed this  
Twenty-first Day of February, 2023

Katherine Kelly Vidal  
*Director of the United States Patent and Trademark Office*